United States Patent [19]

Barrot et al.

[11] 4,196,637

[45] Apr. 8, 1980

[54] VIBRATORY DEVICE WITH CONTROLLED ACTUATION

[75] Inventors: Paul M. E. Barrot, Clichy; Jean-Claude Barrot, Neuilly, both of France

[73] Assignee: Babbitless, Paris, France

[21] Appl. No.: 859,269

[22] Filed: Dec. 9, 1977

Related U.S. Application Data

[63] Continuation of Ser. No. 682,857, May 3, 1976, abandoned.

[30] Foreign Application Priority Data

Jun. 16, 1975 [FR] France ............................... 75 18742

[51] Int. Cl.² .............................................. B06B 1/16
[52] U.S. Cl. ....................................... 74/61; 318/85; 209/367
[58] Field of Search .............. 74/61; 318/85; 209/367, 209/366.5, 365 R, 504; 198/770

[56] References Cited

U.S. PATENT DOCUMENTS

| | | | |
|---|---|---|---|
| 3,332,293 | 7/1967 | Austin et al. | 74/61 |
| 3,465,599 | 9/1969 | Hennecke et al. | 74/61 |

FOREIGN PATENT DOCUMENTS

| | | |
|---|---|---|
| 678136 | 9/1966 | Belgium . |
| 825427 | 2/1975 | Belgium . |
| 22352 | 9/1969 | Japan ...................................... 209/367 |

Primary Examiner—Ralph J. Hill
Attorney, Agent, or Firm—Owen, Wickersham & Erickson

[57] ABSTRACT

A vibratory device has a vibrating chassis disposed horizontally or inclined and which is actuated by linear vibration by means of a vibrator having two unbalanced shafts rotating synchronously in opposite directions. For obtaining continuous regulation, during functional operation, of the reciprocal angular phase displacement of the unbalancing masses, the unbalanced shafts are connected with two drive shafts coupled by a chain. The two runs of the chain can be altered in length by adjustment of a pivoting lever.

3 Claims, 13 Drawing Figures

VIBRATORY DEVICE WITH CONTROLLED ACTUATION

This is a continuation of application Ser. No. 682,857, filed May 3, 1976, now abandoned.

The present invention relates to a vibratory device having a vibratory chassis provided with a vibrator which includes two horizontal unbalanced shafts disposed transversely to the longitudinal axis of the chassis and subjected to synchronous rotary movement in opposite directions.

The two shafts have equal unbalanced masses. For instance, unbalancing members may be keyed to fix permanently on the shafts, the weight of the respective unbalancing members being capable of being modified at will when the device is at rest. The arrangement thus produces linear vibrations in a plane passing through a line lying in the common place of the axes of the two shafts substantially at equal distances from the axes.

Such a vibratory device may form, in particular, a screen for granular size classification and/or a supply feeder, for example a pre-screen feeder serving particularly for the supply to a primary crusher of an installation for the mechanical treatment of materials or any other disposition of this kind susceptible of being utilised for dimensional classification and or supplying materials in the spheres of public works, building, mines, quarrying, chemical industry, and treatment of urban refuse or garbage.

There have previously been proposed various types of vibratory devices provided with vibrators having two unbalanced shafts actuated through synchronous rotational movement in opposite directions. The principal characteristic of these vibrators resides in that they engender linear vibrations, as opposed to vibrators having but a single unbalanced shaft which produce circular vibrations and various other vibrators which produce elliptical vibrations. It is to be noted that in vibratory screening devices actuated by circular or elliptical vibrations only one component of these vibrations is utlised insofar as the force used for granular size separation is concerned.

On the other hand in vibratory devices actuated by linear vibrations the whole of the driving force is transformed into vibrations orientated in the same direction which can be chosen with precision such that all the available energy may be utilisable.

Pre-screening may be horizontal or they may be inclined. When they are inclined the advancing motion of the material on the inclined vibrating chassis is achieved in part by gravity, which enables this sort of apparatus to function not only with linear vibrations but also with elliptical or circular vibrations. However, the inclination of the vibrating chassis gives rise to the inconvenience that, since the material to be treated contains large aggregates, these can have the tendency to descend too quickly under gravity, i.e. it is difficult to control their speed.

On the other hand vibratory dispositions which are substantially horizontal permit accurate control of the speed of advancement of the materials. In fact this speed depends solely upon the inclination of the plane of the vibrations in relation to the vertical, i.e. these vibrations assure at the same time the effect of granular size separation of the materials and the effect of advancing motion.

These horizontal vibrating dispositions usually utilise vibrations having two parallel horizontal shafts carrying unbalancing members of the same mass keyed in symmetrical positions on the two shafts, these latter being actuated by a synchronous rotary movement in opposite manner. Such vibrators engender linear vibrations in a plane corresponding to the median plane of the two shafts. It is possible to mount the two shafts on the chassis such that the plane passing through the two axes is inclined in relation to the horizontal in the direction of advancing motion of the materials, to incline the plane of the vibrations in relation to the vertical by a fixed amount determined once for all.

In the case of some horizontal vibratory dispositions, particularly pre-screening feeders placed directly upstream of a primary crusher, there often arises the problem of being able to reduce the speed of advance of the materials, if possible without diminishing the effect of shaking, in accordance with the state of cleanliness (which is very variable in the course of time) of the material to be treated. The unsorted material despatched on to a feeder, particularly when it has been extracted from the surface and is humid, contains in fact fine particles which adhere strongly to larger aggregates. To disengage the adhering particles from the aggregate prior to sending them to the crusher it may be suitable to subject them to a shaking which is more intense or longer than that for aggregates contained in unsorted material extracted from a depth and hence drier or cleaner.

In horizontal vibratory dispositions of known kind with linear vibrations inclined at a fixed angle in the direction of advance of the materials, a variation in the speed of advance of the materials can only be effected through the expedient of variation of speed of rotation of the two unbalanced shafts. However, a reduction of the speed of rotation of the two unbalanced shafts involves a reduction of the amplitude of vibrations and has a tendency to being about a simultaneous diminution of the effect of shaking since the reduction of the amplitude of vibrations causes at the same time diminution in the horizontal component and in the vertical component of the vibrations. Thus the materials are indeed shaken longer on a vibratory disposition of a given length but this shaking is concurrently less intense, in a manner such that this mode of control does not permit the requisite to be achieved.

It has likewise previously been proposed, in the case of such horizontal vibratory dispositions provided with a vibrator having two parallel unbalanced shafts each with an unbalancing member of the same mass in a position symmetrical with respect to the unbalancing member of the other shaft, to mount these two shafts on the vibrating chassis through the intermediary of a common rotative cylindrical support in a manner such that through modification of the angular position of the said support, by means of an adjusting mechanism, it is possible to tilt with respect to the vertical the plane of the vibrations which corresponds to the median plane of the axes of the two shafts. However, this adjusting mechanism and the rotative support of the two shafts need to be mounted on the vibratory chassis and always damp its vibrations, which imposes impedance problems which are difficult to solve.

What is desired is to remedy the already enumerated disadvantages and to construct a vibratory device in particular a screen and/or a feeder, for example a pre-screening feeder, whose chassis, substantially horizontal or inclined, is equipped with a vibrator permitting variation to be made in the efficacy of screening without having to stop the vibrator, this variation in efficacy being effected in a continuous manner, without a reduction of the speed of advance involving a diminution in the shaking effect. Another object is to permit a variation of the speed of advance of the materials over a wide range between the maximum speed of advance and null speed of advance and even to provide a recoil of the materials on the vibratory chassis. It has indeed been evidenced in the case of a feeder receiving material to be treated from a height on leaving a hopper that it can come about that the materials become, in the hopper above the feeder, blocked due to the formation of a vault or arch this arch subsisting sometimes even when the speed of advance is yet further increased. Then the sole way to get rid of this vault, without exterior intervention which presents risks and difficulties in the case of substantial feeders used for materials containing heavy aggregates, consists in orientating the vibrations in a manner such that they bring about recoil of the materials so that the aggregates vibrating on the chassis in front of the vault may be projected in the recoil direction against the bottom face of the vault, thereby bringing about its collapse.

The present invention provides a vibratory device of a kind such as a screen and/or feeder or the like having a vibrating chassis with elastic mounting provided with a vibrator having two parallel, horizontal, unbalanced shafts disposed transversely of the longitudinal axis of the chassis and actuated by a synchronous rotary movement in opposite manner, the unbalancing members of the two shafts being of the same mass and being keyed in fixed manner on the shafts, producing in this way linear vibrations in a plane passing through a line situated in the plane common to the axes of the two shafts substantially at equal distances from these axes. The vibrator possesses means enabling variation in a continuous manner, during functional operation, of the angular phase displacement of the two unbalanced shafts, of the one with respect to the other, in a manner such as to enable variation of the orientation of the plane of the vibrations to be obtained without modification of the amplitude of these vibrations.

The relative angular phase displacement of the two unbalanced shafts may, for example, be regulable through a range of 360°, which permits a variation of orientation of the plane of vibration through a range of 180°.

However it has been found that for numerous applications it is sufficient to make available an angular phase displacement range limited to a range of about 180° permitting a variation of the orientation of the plane of vibration through a range of about 90°.

In fact, on a vibrating chassis with a horizontal surface for transporting materials, the advance of the materials at maximum speed is generally obtained with linear vibration in a plane inclined with respect to the horizontal. This inclination (which varies in accordance with the nature of the materials and the load on the chassis, e.g. the thickness of the layer of materials on the chassis) may be between about 30° and 45° for usual materials dispatched for example by a pre-screening feeder to a primary crusher. Therefore, with a vibrator permitting variation of orientation of the plane of the vibration through a range of about 90°, in order to be able to increase both the maximum advancing speed and sufficient recoil of the materials, it is advantageous to mount the vibrator on the chassis such that a common plane of the axes of the two unbalanced shafts may be inclined with respect to the horizontal by 15° to 30° for example. Thus by effecting variation of the angular phase displacement of the two unbalanced shafts of plus or minus 90° (bringing with it a variation of orientation of plane of vibration of plus or minus 45°), it is possible to tilt the plane of the vibrations for example between about 30° and 15° with respect to the horizontal in the direction of advance and between about 30° and 15° with respect to the vertical in the direction of recoil of the material on the vibrating chassis, that is, to attain, on the one hand, the maximum speed of advance and, on the other hand, a sufficient speed of recoil.

The mounting of such a vibrator on an inclined vibrating chassis is effected in a corresponding manner, of course taking into account the inclination which the chassis itself has.

Further the two unbalanced shafts are with advantage mounted on the vibrating chassis in a manner such that the line which is situated, in the common plane of the axes of the two shafts, substantially at equal distance from these axes, passes substantially through the centre of gravity of the vibrating chassis whatever may be the orientation of the plane of the vibrations, to assure for the chassis a mode of functioning exempt from parasitic movements over the whole range of variation of orientation of vibrations.

In a preferred embodiment in which the two unbalanced shafts are rotated by a common drive motor, the control means for regulation of the angular phase displacement of the unbalanced shafts with respect to one another may be constituted by a control mechanism having two wheels, one of which is driven directly by the motor, the wheels being coupled for rotation to the respective unbalanced shafts, a chain, a notched roller, or an analogous endless connection coupling together (without slip) the two wheels so as to cause them to turn synchronously in opposed directions, and adjusting means operating on the driving portions or runs of the said chains between the two wheels for extending the one of the driving portions and for shortening of the other, and inversely.

In another embodiment it is possible to drive each of the two unbalanced shafts from its own drive motor. It is advantageous in this case to use two synchronised electric motors of asynchronous type with electrically coupled rotors and to operate the variation of angular displacement of the two unbalanced shafts, the one with respect to the other, on the basis of the motors as for example by mechanical angular displacement of the stator of the one or of the two motors or by action on the rotor or stator supply of the one or of the two motors by way of an angular phase displacement of the rotor magnetic field or of the stator magnetic field of the one or of the two motors the one with respect to the other.

The invention will be described further, by way of example only, with reference to the accompanying drawings, in which:

FIGS. 1a to 4b schematically show the two unbalanced shafts of a vibrator, with various angular phase displacements for the two unbalanced shafts;

FIGS. 1a to 4b first of all illustrate the manner in which relative angular phase displacement of two unbalanced shafts (having unbalancing members of the same mass and turning in synchronism in opposite directions) enables variation of the orientation of the plane of the linear vibrations produced by these two unbalanced shafts.

Figure 1A:
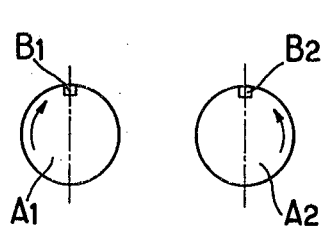
Figure 1B:
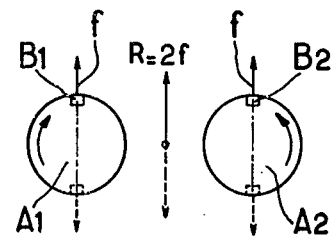

The two shafts $A_1$, $A_2$, having respective unbalancing members $B_1$, $B_2$ of the same mass, are driven in synchronism in opposite directions, as indicated by the arrows, the shafts being rotatively mounted on a common support (not shown). In FIGS 1a and 1b the shafts $A_2$, $A_2$ are not angularly phase displaced, i.e. their unbalancing members $B_1$, $B_2$ always occupy a symmetrical position with respect to one another, whatever may be the angular position of the shafts. In consequence of the rotation of the shafts, the unbalancing members $B_1$, $B_2$ are each subject to a centrifugal force f, but, since the shafts turn in synchronism in opposite directions, the two forces f produce a resultant force R (acting on the common support) solely in the median plane of the axes of the shafts $A_1$,$A_2$. The resultant force R has maximum value of 2f, when the unbalancing members $B_1$,$B_2$ occupy the position shown in FIG. 1a and when they occupy the diametrically opposite position indicated in broken lines.

Figure 2A:
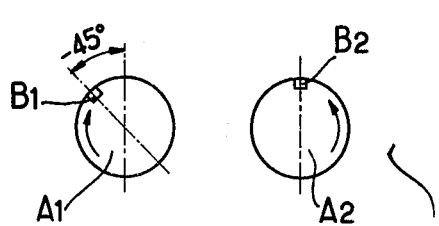
Figure 2B:
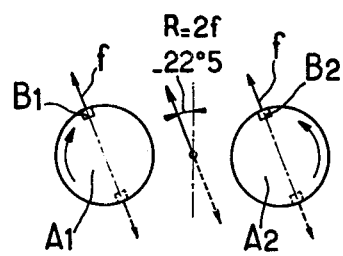

In FIG. 2a the two shafts $A_1$,$A_2$ have a mutual angular phase displacement of 45°, the shaft $A_1$ being at −45° to the position shown in FIG. 1a. The forces f on the two unbalancing members $B_1$,$B_2$ combine here to form the resultant R in a plane making an angle of −22.5° with the vertical (FIG. 2b).

Figure 3A:
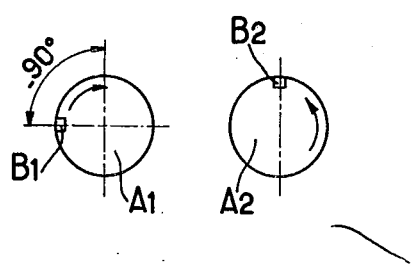
Figure 3B:
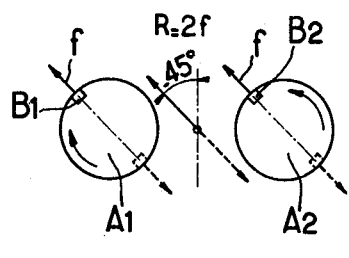

In FIG. 3a, the shaft $A_1$ has been phase displaced −90° and the plane in which the forces f of the members $B_1$,$B_2$ combine to form the resultant R makes an angle of −45° to the vertical (FIG. 3b).

Figure 4A:
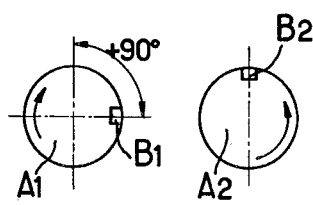
Figure 4B:
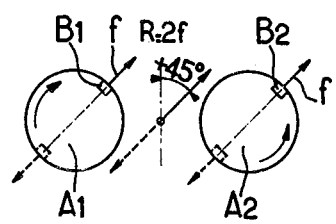

In FIG. 4a the shaft $A_1$ has been phase displaced +90°, which leads to an inclination of the resultant R by +45° with respect to the vertical (FIG. 4b).

The effect of the resultant R thus makes itself shown always in the form of linear vibrations in a plane passing substantially through the line situated in the common plane of the axes of the two shafts $A_1$,$A_2$ substantially at equal distances from these axes, the amplitude of these variations remaining constant, since the maximum intensity, 2f of the resultant R remains constant, whatever may be the angular phase displacement of the shafts; the orientation of the plane of the vibrations—measured by the angle of inclination of this plane—corresponding to half of the angle of phase displacement between the shafts. In other words the resultant R corresponds to a vector for the vibration intensity of constant maximum having its origin substantially at the centre of the line joining the two axes and for its argument one half of the angle of displacement as between the two shafts.

FIGS. 1a to 4b represent the conditions which follow a reciprocal displacement of the two shafts $A_1$,$A_2$ of through ±90°, i.e. a range of 180°, leading to a variation in the orientation of the plane of the vibrations through ±45°, i.e. a range of 90°, but it is self-evident that this displacement can be effected in a manner corresponding to ±180°, i.e. a range of 360°, thus to give a variation of ±90° in the orientation of the plane of vibrations, i.e. a range of 180°.

However, as already mentioned above, it is generally possible to limit the variation of the orientation of the plane of vibrations to a range of 90°, which simplifies the phase displacement control. In this case the vibrator is mounted on the vibrating chassis in an angular position such that the vibrator can impose upon the chassis, as well as vibrations bringing about advance of the materials at maximum speed, vibrations enabling a recoil of the materials on the chassis.

Figure 5:
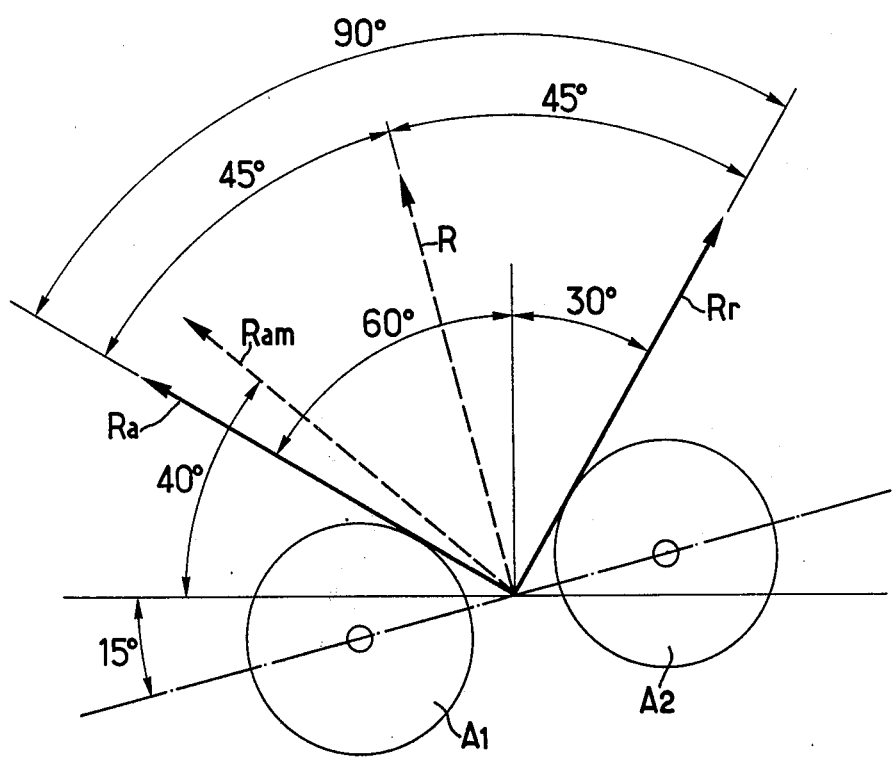
FIG. 5 is a diagram illustrating the choice of the preferred position of mounting of the vibrator on a vibrating chassis of a horizontal vibrating device.

FIG. 5 illustrates an example of mounting of a vibrator with a range of orientation of vibrations limited to 90°, this is to say ±45° with respect to the neutral position at which the two unbalanced shafts $A_1$, $A_2$ are in phase and the plane of the vibrations coincides with the median plane of the axes of the two shafts. In this example it is assumed that the vibrating chassis is horizontal and that the nature of the materials and the load of the vibrating chassis are such that advance of the materials at maximum speed on the chassis is obtained with linear vibrations in a plane inclined at 40° with respect to the horizontal.

In order to be able to attain (by variation of orientation of the plane of vibrations through ±45°) a position giving maximum speed of advance and also a position providing a sufficient speed of recoil, the common plane (chain-dotted line) of the axes of the two shafts $A_1$,$A_2$ is inclined at an angle of 15° to the horizontal, which permits the resultant R of the vibrations to be orientated, with respect to the vertical, at 60° in the direction for advance (Ra), i.e. beyond the inclination giving the maximum speed of advance (Ram), and at 30° in the direction for recoil (Rr).

Figure 6:
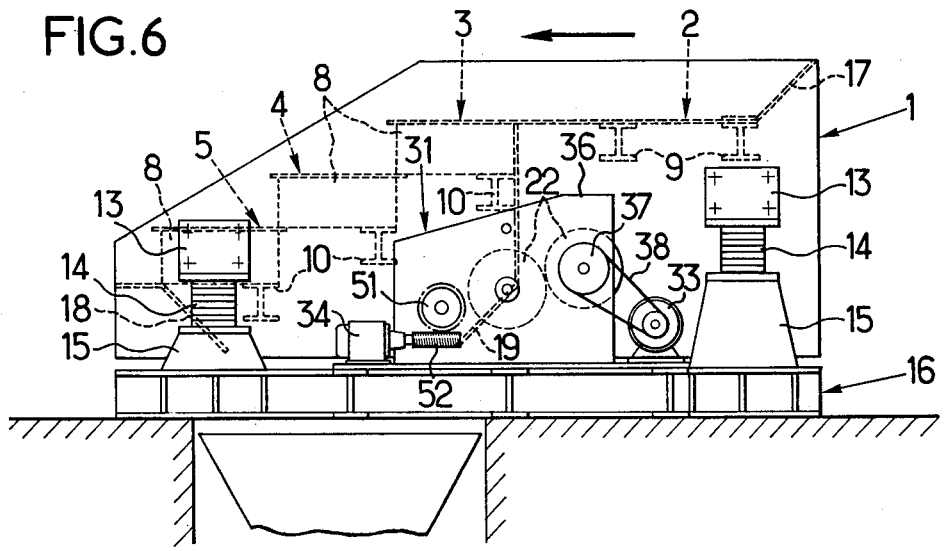
FIG. 6 is a side view of a pre-screening feeder provided with a vibrator.
Figure 7:
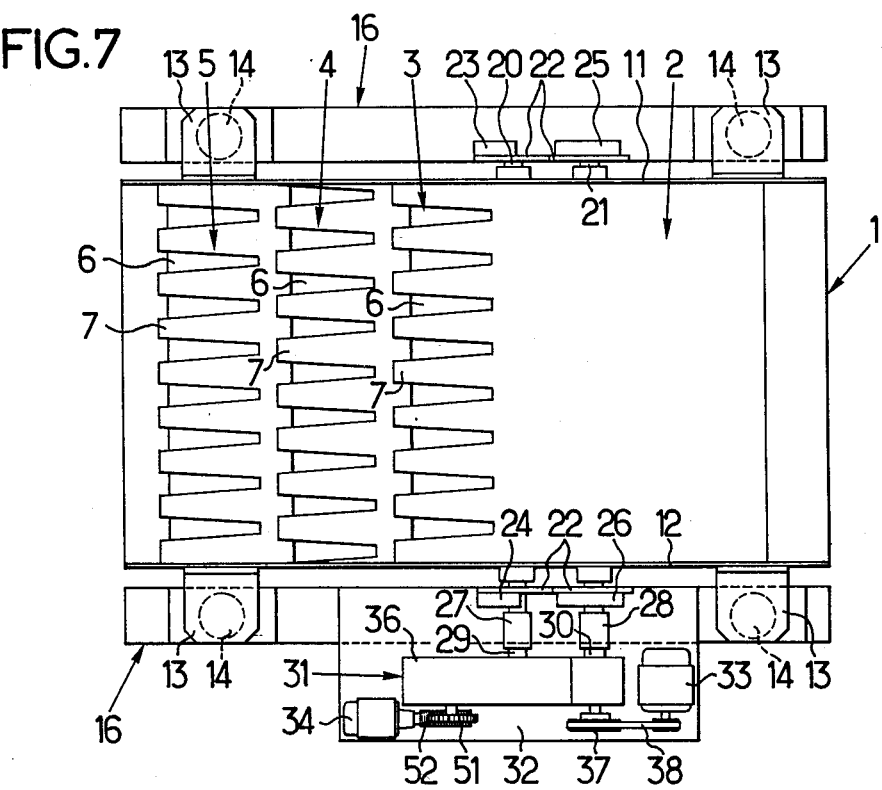
FIG. 7 is a plan view of the feeder of FIG. 6.
Figure 8:
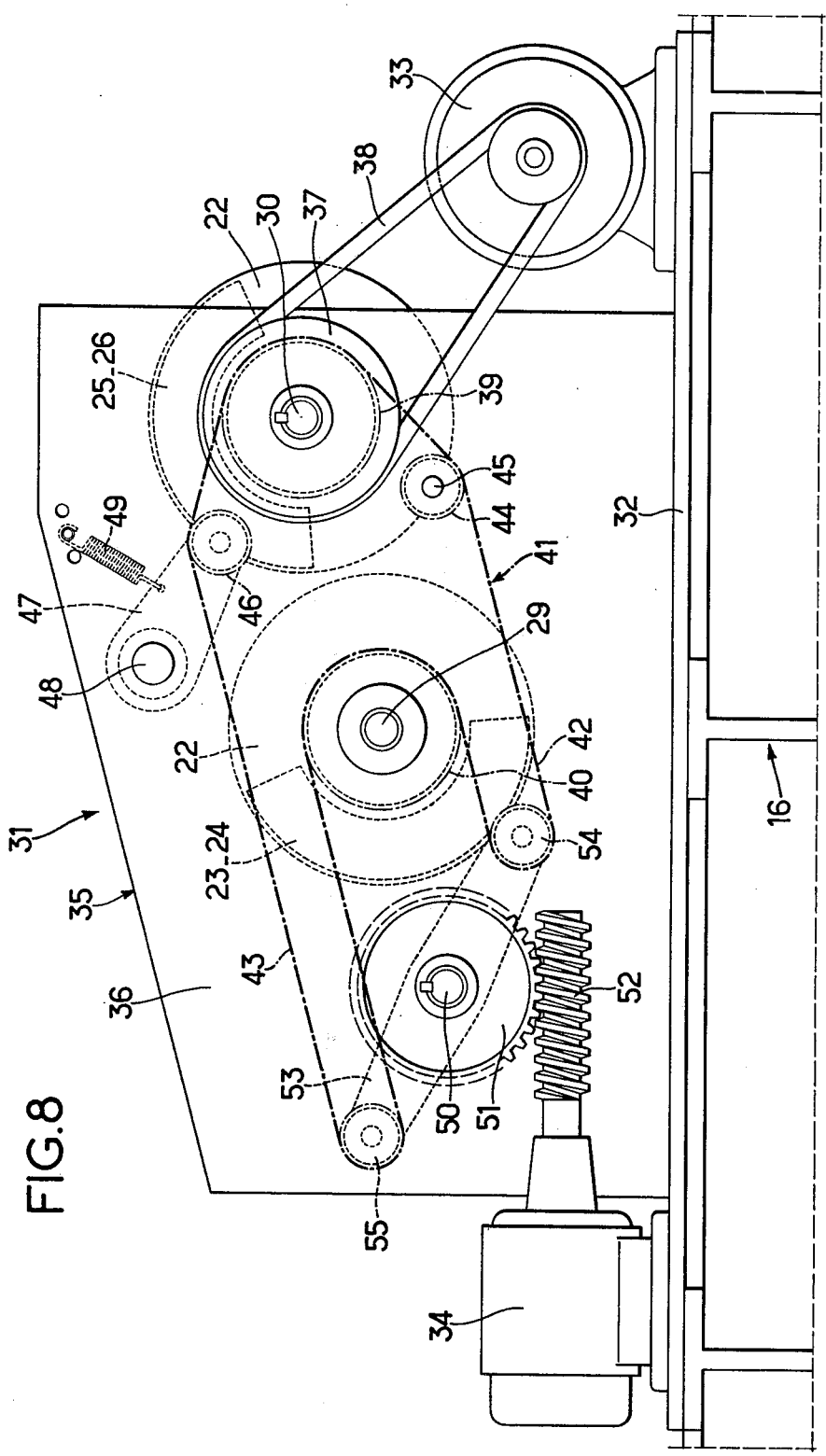
FIG. 8 is an enlarged side view of the vibrator shown in FIG. 6 and its phase displacement control mechanism.

FIGS. 6 and 7 illustrate a pre-screening feeder provided with a vibrator having two unbalanced shafts as described above, in which the variation in angular phase displacement of the unbalanced shafts is effected by a control mechanism shown in more detail in FIG. 8.

The pre-screening feeder includes a vibrating chassis 1 in the form of a casing assembled from steel sheeting by welding. The surface for feeding and screening in the chassis 1, includes successive horizontal planes forming three stages, viz., at a first level, a feeder plane 2 prolonged by a first pre-screening plane 3, and, at two lower levels, second and a third pre-screening planes 4 and 5, all formed by horizontal tables covering the whole width of the chassis 1. The tables of the three pre-screening planes 3,4,5 have across the whole of their widths longitudinal slots 6 whose width increases in the direction of the outlet end of the chassis 1.

The teeth 7 between the slots 6 are re-inforced by longitudinal slabs 8 placed edgewise below the planes 3,4,5, under each tooth 7. The feed and screening surface of the chassis is supported by transverse beams: the feeder plane 2 is supported directly by two beams 9 and the pre-screening planes 3,4,5 are supported through the intermediary of the slabs 8, each by a beam 10. The planes 2,3,4,5, the slabs 8, and the beams 9, 10 are welded to the sidewalls 11,12 of the chassis 1.

The chassis 1 has four legs 13 fixed to the exterior of the sidewalls 11, 12 at some distance from their ends. The legs 13 have dampers 14, for example of rubber, resting upon supports 15 fixed on a bed 16 formed, for example, from girders welded together.

The feeding plane 2 is longitudinally limited (remote from the planes 3,4,5) by an inclined plane 17 which prevents the materials deposited on the plane 2 from falling off. Two transverse walls 18, 19 inclined towards one another are fixed below the extremities of the screening surface formed by the three pre-screening planes 3,4,5 in order to direct the material fractions which have passed through the slots 6 of the pre-screening planes 3,4,5 into a hopper.

The vibrator for this feeder has two parallel horizontal shafts 20, 21 extending transversely to the length of the chassis (see FIG. 7). The shafts 20, 21 are rotatably mounted in the sidewalls 11,12 of the chassis 1 and extend from them. On the extremities of the shafts 20, 21 discs 22 are keyed to each of which is fixed an unbalancing member 23,24,25,26 respectively. The unbalancing members 23,24 on the one hand and the unbalancing members 25, 26 on the other hand are connected so as to be fixed permanently in the same angular position on the shafts 20,21 respectively.

The shafts 20,21 are mounted on the chassis 1 with an inter-axial minimum spacing determined by the diameter of the discs 22, in a position such that the line lying in the plane common to axes of the shafts 20,21 and at equal distance from these axes passes substantially through the centre of gravity of the chassis 1, and such that the said plane is inclined at about 15° downwards from the horizontal (see FIG. 6) in the direction of advance (indicated by an arrow) of the materials on the feeding and screening surface of the chassis 1.

The shafts 20,21 are connected at one side of the chassis 1, by couplings 27, 28 (for effecting disalignment) to respective output shafts 29,30 of a phase-displacement control mechanism 31 stationarily mounted on a base plate 32 fixed to the bed 16. The base plate 32 also carries an electric drive motor 33 and an electric control motor 34.

From FIG. 8 it can be seen that the control mechanism 31 has a housing 35 (of which only the front lateral facing 36 is visible in FIGS. 6 to 8) containing the two shafts 29,30 which connect up with the two shafts 20, 21 (FIG. 7). The shafts 29,30 are mounted for rotation in the lateral sidewalls of the housing 35 so that they are in alignment with the shafts 20,21. Outside the facing 36, the shaft 30 carries a pulley 37 driven by the motor 33 via a belt 38. In the interior of the housing 35 the shaft 30 carries a chain-wheel 39.

The shaft 29 in turn carries (in the housing 35) a chain-wheel 40 coupled with the wheel 39 by a chain 41 in such a manner that these wheels turn in synchronism but in opposite directions. The two runs 42, 43 of the chain 41 between the two wheels 39,40, pass, respectively over a chain wheel 44 on a spindle 45 and over a chain wheel 46 mounted for rotation on the end of a lever 47 pivoting about an axis 48 the lever 47 being urged outwards by a tension spring 49 so as to keep the chain 41 taut.

In the plane containing the axes of the two shafts 29, 30, a shaft 50 is mounted for rotation, beyond the shaft 29, in the sidewalls of the housing 35. A toothed wheel 51 is keyed on the shaft 50, outside the housing 35; this wheel 51 cooperates with a worm 52 driven by a motor 31 which may be remotely controlled. In the housing 35 the shaft 50 carries a two-armed lever 53 whose arms are of equal length, two chain wheels 54 and 55 being mounted for rotation at the two ends of the lever 53. The lower run 42 of the chain 41 passes from the wheel 40 on to the wheel 54 then on to the wheel 44 prior to reaching the wheel 39, while the upper run 43 passes from the wheel 39 on to the tension wheel 46 then on the the wheel 55 prior to reaching the wheel 40.

On assembly, the pivoting lever 53 is placed in a position substantially perpendicular to the plane containing the three shafts 30,29,50 and the chain 41 is positioned on the various wheels so that the wheels 39 and 40 take up a relative angular position such that the unbalancing members 23,24, on the one hand, and the unbalancing members 25,26, on the other hand, occupy a symmetrical relative position during rotational drive of the shafts 29,30 by the motor 33, the unbalanced shafts 20,21 thus producing linear vibrations in the median plane of the common plane of their axes (see FIGS. 1b and 5). Subsequent pivoting of the levers 53 modifies the respective lengths of the runs 42 and 43 of the chain 41, which produces an angular phase displacement of the two shafts 29 and 30 and thus of the unbalancing members 23, 24 with respect to the unbalancing members 25,26 without modification of the speed of synchronous rotation of the shafts 29 and 30.

FIG. 8 illustrates an extreme position which can be taken up by the lever 53, this position giving rise to a relative angular phase displacement of 90° of the two shafts 29,30 (displacement in accordance with FIG. 3a). A displacement corresponding to the opposite direction (in accordance with FIG. 4a) is obtained when the lever 53 is pivoted into its other extreme position. The angular displacement comes about due to the shortening undergone by one of the runs of the chain 41 and the corresponding lengthening of the other run following pivoting movement of the lever from the position in which it is perpendicular to the plane passing through the three shafts 30,29,51, in which position the two runs 42, 43 have the same length.

It will be readily understood that the chain 41 may be replaced by any other equivalent transmission line such as a belt notched along its two faces. In the same way the pivoting lever and its control may be replaced by equivalent means permitting variation in continuous manner of the position of the two wheels 54, 55, in opposition, so that one of the runs of the chain 41 becomes shortened and the other becomes lengthened.

In the embodiment described above, the two unbalanced shafts 20, 21 are driven by a single motor 33, i.e. the shaft 21 directly and the shaft 20 by means of the chain 41. This latter must therefore transmit practically half of the torque developed by the motor 33. This can pose problems of resistance, at the level of the chain 41 and the control mechanism 31, for example in the case of powerful vibrating screens or feeders.

This is why, according to one modification, the two unbalanced shafts 20, 21 can be driven separately by two identical independent motors, while being kept mechanically connected by a displacement control mechanism 31 as represented in FIG. 8. Thus this mechanism 31 does not take part in the drive torque transmission. The only forces to which the chain 41 is then subjected are those which imply the synchronisation of the two shafts and the synchronous movement with displacement of these shafts. In comparison with the drive torque these forces are very weak.

Finally, so as to completely suppress the displacement control mechanism 31 as represented in FIG. 8, it is also possible to provide two drive motors, one for each shaft, these two motors rotating synchronously, and to operate the angular displacement of the two shafts at the level of one or other of the two motors.

Figure 9:
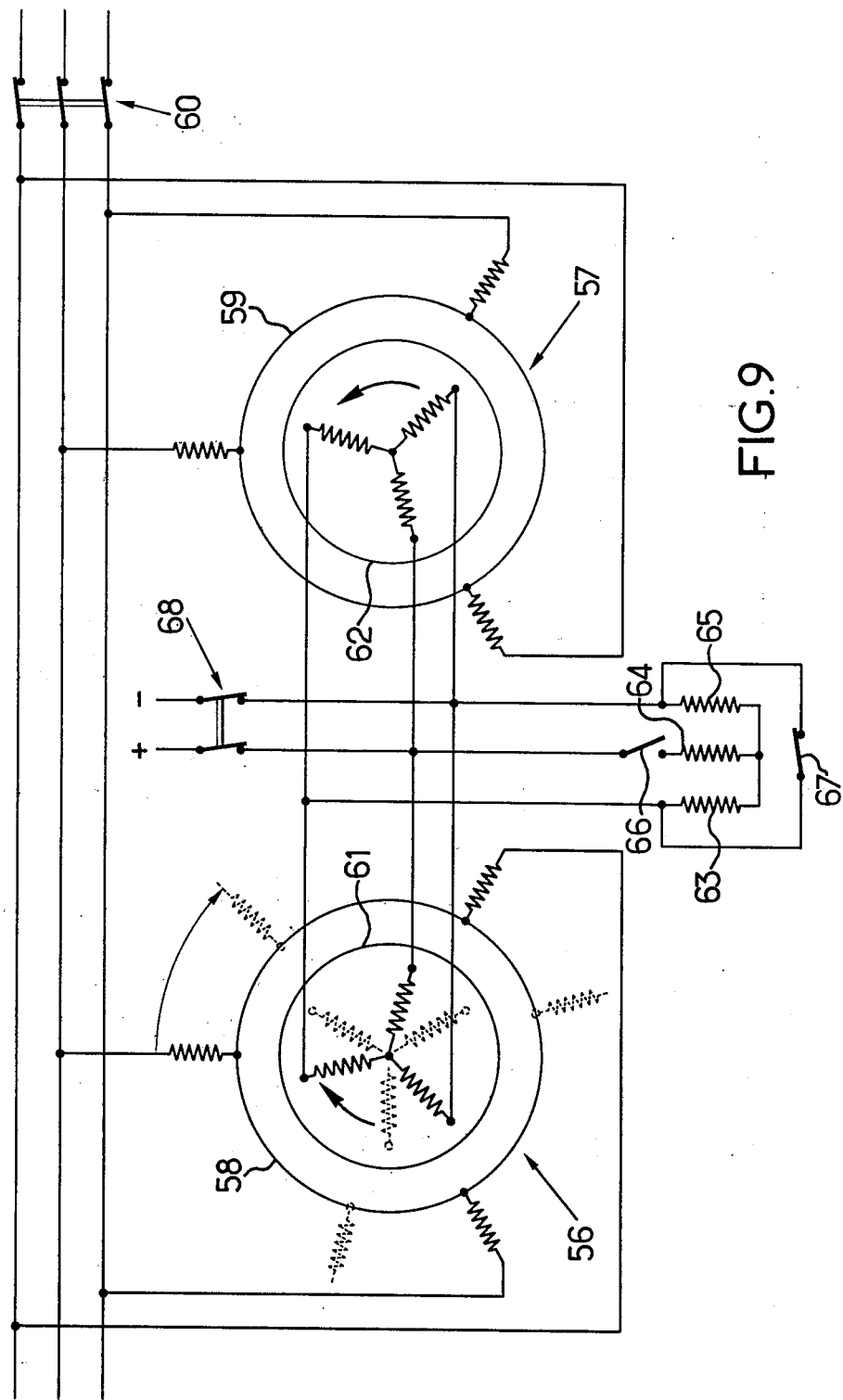
FIG. 9 is a circuit diagram of means for varying angular phase displacement of the two unbalanced shafts, based on one of the two electric drive motors for the shafts.

FIG. 9 represents schematically an embodiment of this modification.

In FIG. 9 the two drive motors for the two unbalanced shafts are electric motors 56 and 57 of asynchronous type, operated synchronously. The three-phase inductor coils of the stators 58 and 59 are connected so as to produce oppositely directed rotating fields, being connected up through a three-phase contactor 60 in common to a supply network. The three-phase windings of the rotor 61 and 62 are electrically directly intercoupled. To this end three resistances 63, 64, 65 of the same value connect respectively to the three motor windings i.e. the resistances 63 and 65 directly and the resistance 64 through the intermediary of an interrupter 66. A circuit including an interrupter 67 is furnished in order to shunt the resistances 63, 64, 65. Further, direct current can be injected through a bipolar contactor 68 into the rotor windings of the two motors 56, 57.

This connection mode corresponds to the known scheme for starting synchronised asychronous motors, in the manner of usual asychronous motors with three phase rotors, by the insertion of starting resistances 63, 64, 65 (the interrupter switch 66 being closed) into the various phases of the rotor windings, and in order to synchronise such motors on the feed supply network by the injection of a direct current into the rotor windings, on closure of the contactor 68, with opening of the interrupter 66 and shunting of the starting resistances 63, 64, 65 by closure of the interrupter 67.

After starting, the two rotors 61, 62 of the two motors 56, 57 rotate in synchronism in opposite directions and drive the two unbalanced shafts 20 and 21, for example as in FIG. 8, through the intermediary of couplings 27, 28. In order to bring about an angular displacement of the two unbalanced shafts, of the one in relation to the other, one of the stators, for example the stator 58, is made to turn about its axis, so that it takes up the position represented by broken line in FIG. 9, which entails a corresponding angular displacement of the inductor field and so likewise of rotor 61 in relation to rotor 62, without disturbing the synchronous rotation of the two rotors 61, 62. To permit this angular displacement of the stator 58 it may, for example, be rotatably mounted by a clamp upon a support of corresponding form so that it can be turned with respect to the support through the operation of an adjusting mechanism having, for example, a toothed wheel or a toothed segment geared to a worm driven by a motor, in a manner analagous to the wheel 51, worm 52, and motor 34 of the control mechanism 31 of FIG. 8.

Other possibilities of operating such a continuous angular phase displacement of two unbalanced shafts when driven by two synchronous motors may involve, for example, bringing about out-of-phase operation, electrically or electronically, in the voltage supply to the stator of one of the motors, or opposite out-of-phase operation in the voltage supply fed to the stators of the two motors. It will also be understood that it is possible to effect the continuous current supply of the rotor windings of one or of the two motors in order to angularly displace the magnetic excitation field increasing the current amplitude fed into one of the phase windings and consequent reduction of the current intensity in the other phase winding or other phase windings of the rotor or rotors.

The relative angular displacement of the two unbalanced shafts of the vibrator, in relation to the neutral position in which the two unbalanced shafts are positioned symmetrically, with respect to their common plane enables desired orientation of the resultant of the linear vibrations produced by the vibrator to be achieved without variation in the maximum amplitude of these vibrations. Starting from the neutral position, (which, in the above example, corresponds to an inclination of 15° from the vertical), it is possible, on the one hand, to tilt the resultant more in the direction of advance of the materials until a position is reached corresponding to the maximum speed of advance of the materials, and, on the other hand, to reduce the tilting of the resultant and even to tilt it in the direction of recoil. On reduction of the tilting of the resultant, the vertical component of the vibration is increased and the horizontal component is decreased, i.e. the speed of advance of the materials diminishes and the shaking of the materials increases, these two phenomena combining to contribute to optimum efficacy of the screening. The screening efficiency of a screening surface of given length is a function of the shaking effect (i.e. the amplitude of the vertical component of the vibration) and of the number of times that the material is shaken during its passage across the screening surface, which number is inversely proportional to the speed of advance. It will be seen that the above-described vibrator permits, as desired, an increase in the efficacy of screening in a continuous and simple manner.

It will be self-evident that the embodiments hereinbefore described are merely by way of illustrative example and are non-limitative, with numerous modifications and variations being possible within the scope of the invention as claimed.

It may be likewise necessary to note that although, in the above description, the vibrating device is a pre-screening feeder with a horizontal vibrating chassis, the utilisation of the vibrator with controlled actuation, in accordance with the invention, is not limited to this application but can be extended to any other vibrating device with a vibratory chassis, which may be horizontal or inclined. The screening and/or feed surface in the device may be formed by a single plane or may be divided into a number of stages in cascade and may, in regard to its construction, be selected in accord with usual functional criteria having regard to the nature of the materials to be treated and the type of treatment to be effected.

We claim:

1. A vibratory device comprising a chassis, means for mounting the chassis for vibration in a vertical direction and a longitudinal horizontal direction, a vibrator having two horizontal parallel unbalanced shafts mounted transversely to the longitudinal axis of the chassis, having equal unbalanced masses and synchronously rotating in opposite directions to produce linear vibration of the chassis in a plane, passing through a line which is situated in the plane common to the axes of the two shafts and is substantially at equal distances from these axes, the two unbalanced shafts being each driven by a separate motor, the motors being synchronized asynchronous electric motors whose rotors are electrically coupled and whose stators are connected to the same electrical supply, the stator of one of the said motors being rotatively displaceable so as to obtain an angular phase displacement of the inductor field, and thus of the rotor of this motor, with respect to the other motor, with control means for continuously regulating, during functional operation, said angular phase displacement.

2. A vibratory device comprising a chassis, means for mounting the chassis for vibration in a vertical direction and a longitudinal horizontal direction, a vibrator having two horizontal parallel unbalanced shafts mounted transversely to the longitudinal axis of the chassis, having equal unbalanced masses and synchronously rotating in opposite directions to produce linear vibration of the chassis in a plane passing through a line which is situated in the plane common to the axes of the two shafts and is substantially at equal distances from these axes, the two unbalanced shafts being each driven by a separate motor, the motors being synchronized asynchronous electric motors whose rotors are elctrically coupled and whose stators are connected to the same electrical supply, control means being provided for bringing about an out-of-phase mode of operation of the supply voltage applied to the stator of at least one of the motors;, and for continuously regulating, during functional operation, the amount of angular phase displacement of the two motors.

3. A vibratory device comprising a chassis, means for mounting the chassis for vibration in a vertical direction and a longitudinal horizontal direction, a vibrator having two horizontal parallel unbalanced shafts mounted transversely to the longitudinal axis of the chassis, having equal unbalanced masses and synchronously rotating in opposite directions to produce linear vibration of the chassis in a plane passing through a line which is situated in the plane common to the axes of the two shafts and is substantially at equal distances from these axes, the two unbalances shafts being each driven by a separate motor, the motors being synchronized asynchronous electric motors whose rotors are electrically coupled and whose stators are connected to the same electrical supply, control means being provided for increasing the intensity of the current injected into the phase windings of one of the two rotors and for reducing the intensity of the current injected into the phase windings of the other rotor, and for continuously regulating, during functional operation, the amount of angular phase displacement of the two motors.

* * * * *